No. 767,296. PATENTED AUG. 9, 1904.
W. P. LEISTER & L. A. HUGHES.
PNEUMATIC SWEEPER.
APPLICATION FILED MAR. 24, 1904.
NO MODEL.

WITNESSES:
J. L. Mocdabu
C. E. Schnell

INVENTORS
William P. Leister and
Lafayette A. Hughes
BY Edson Bro's.
Attorneys.

No. 767,296. Patented August 9, 1904.

UNITED STATES PATENT OFFICE.

WILLIAM P. LEISTER AND LAFAYETTE A. HUGHES, OF CLIFFSIDE, NORTH CAROLINA.

PNEUMATIC SWEEPER.

SPECIFICATION forming part of Letters Patent No. 767,296, dated August 9, 1904.

Application filed March 24, 1904. Serial No. 199,829. (No model.)

*To all whom it may concern:*

Be it known that we, WILLIAM P. LEISTER and LAFAYETTE A. HUGHES, citizens of the United States, residing at Cliffside, in the county of Rutherford and State of North Carolina, have invented certain new and useful Improvements in Pneumatic Sweepers; and we do hereby declare the following to be a full, clear, and exact description of the invention, such as will enable others skilled in the art to which it appertains to make and use the same.

Our invention relates to improvements in pneumatic sweepers. It has for its object to provide a portable sweeper adapted to suck in all dust and dirt from the floor as it is passed thereover and which has flexible means for directing a blast upon portions of the floor over which the machine cannot be made to pass to force the litter from such sections of the floor into the path of the sweeper.

Our invention consists, broadly, of a box or receptacle suitably mounted on wheels and provided with an entrance and exit, the former extending down near the floor and the latter preferably covered with a screen and leading to a fan operated through gear-and-belt connection by one of the wheels of the receptacle, said fan having connected thereto a hose carrying a nozzle through which the blast from said fan passes while the dust or dirt is drawn in through the entrance by suction and is collected in the receptacle. The framework of the machine is provided with suitable supports for the hose and with suitable handles for its locomotion. The fan being operated through a wheel of the machine, it will revolve as long as said machine is in motion and does not require any outside power to run it.

Figure 1:
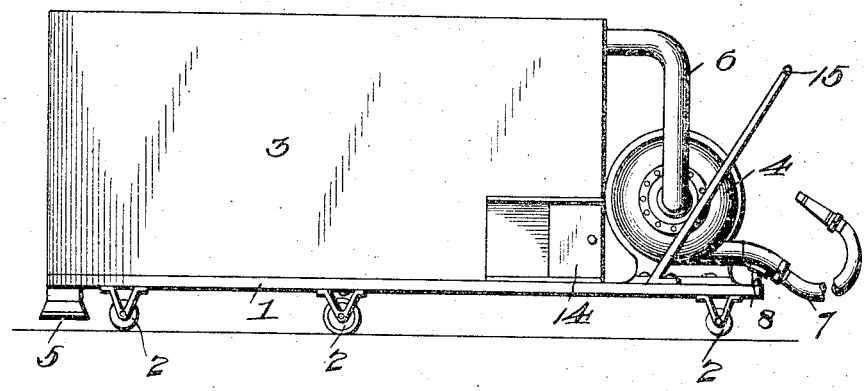
Figure 2:
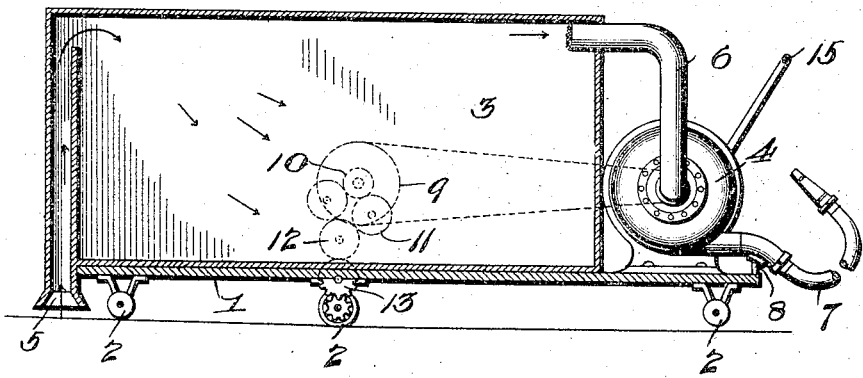

In the accompanying drawings, illustrating the preferred embodiment of our invention, Figure 1 is a side elevation of our invention. Fig. 2 is a longitudinal vertical sectional view taken through the exit-pipe.

Referring more particularly to the drawings, in carrying out our invention we provide a suitable framework or platform 1, mounted on wheels 2 and having arranged thereon a box or receptacle 3 and a fan 4. Said receptacle is provided at one end with an inlet-passage 5, extending down near the floor and up near the top of the receptacle, where it is adapted to deliver the dirt and dust into the interior of said receptacle. A pipe 6 leads from its other end to the fan, the opening into the receptacle being covered by a screen to prevent the dirt and litter from being drawn through said pipe into the fan-chamber. The blast from the fan passes through a hose 7, for which there are provided rests or supports 8 on the platform—preferably one on each side, as shown. Said hose is provided with a suitable nozzle, by which the blast can be directed to any desired point as the sweeper is pushed along.

On one side of the receptacle 3 is pivoted a belt-pulley 9, which is connected by a belt with the drive-pulley of the fan. Said belt-pulley is provided with a gear 10 on one side, which is connected through other gears 11, 12, and 13 to a gear on one of the wheels upon which the platform is mounted, preferably one of a pair of wheels mounted on an intermediate axle, said pair of wheels arranged below the level of the others whereby they are sure to operate and actuate the fan.

The receptacle is provided with a door 14 for removing the contents thereof, and the machine has a suitable handle-bar 15 for its locomotion.

It is understood that changes may be made in our machine without departing from the spirit or sacrificing the advantages of our invention. We therefore reserve the right to make such changes as may fairly fall within the scope of our invention.

Having thus described our invention, what we claim as new, and desire to secure by Letters Patent, is—

1. In a device of the character described, the combination with a platform mounted on wheels, a dust-receptacle, on said platform, having an inlet-passage extending from near the top thereof to a short distance above the floor, a rotary fan also mounted on said platform and having connection with said dust-receptacle, means of operating said fan through one of the wheels of said platform, and flexible means for directing the blast from the fan at different points on the floor with relation to the inlet-passage.

2. In a device of the character described, the combination, with a platform mounted on wheels, a dust-receptacle on said platform having inlet and outlet passages, a rotary fan, the outlet-passage communicating with said fan, a driving-wheel mounted on an intermediate axle secured to said platform and which extends below the plane of the other wheels, and means for connecting up said fan and drive-wheel.

In testimony whereof we affix our signatures in presence of two witnesses.

WILLIAM P. LEISTER.
LAFAYETTE A. HUGHES.

Witnesses:
G. G. AVANT,
ZENO WALL.